United States Patent [19]

Schmidt

[11] Patent Number: 4,530,007

[45] Date of Patent: Jul. 16, 1985

[54] X-RAY DIAGNOSTIC SYSTEM HAVING AN IMAGE INTENSIFIER TELEVISION CHAIN

[75] Inventor: Dieter Schmidt, Hetzles, Fed. Rep. of Germany

[73] Assignee: Siemens Aktiengesellschaft, Berlin & Munich, Fed. Rep. of Germany

[21] Appl. No.: 475,747

[22] Filed: Mar. 16, 1983

[30] Foreign Application Priority Data

Apr. 23, 1982 [DE] Fed. Rep. of Germany ....... 3215114

[51] Int. Cl.[3] ............................................ H04N 5/32

[52] U.S. Cl. .................................. 358/111; 378/117; 378/207

[58] Field of Search ................ 378/117, 207; 358/111

[56] References Cited

U.S. PATENT DOCUMENTS 4,087,686 5/1978 Schmitmann ...................... 378/117

4,335,311 6/1982 Lutz et al. .......................... 358/111

*Primary Examiner*—Howard W. Britton

*Assistant Examiner*—John K. Peng

*Attorney, Agent, or Firm*—Hill, Van Santen, Steadman & Simpson

[57] ABSTRACT

An x-ray diagnostic system having an image intensifier television chain includes sensors for respectively monitoring the presence of x-radiation from an x-ray tube, the presence of light at the output of an x-ray image intensifier, and the presence of a video signal corresponding to the x-ray image. Each sensor supplies an electronic signal to a safety circuit which is connected to the high voltage generator for the x-ray tube. If, after the presence of x-radiation is detected, no light and/or no video signal is detected, the safety circuit automatically disconnects the x-ray tube from the high voltage generator.

1 Claim, 1 Drawing Figure

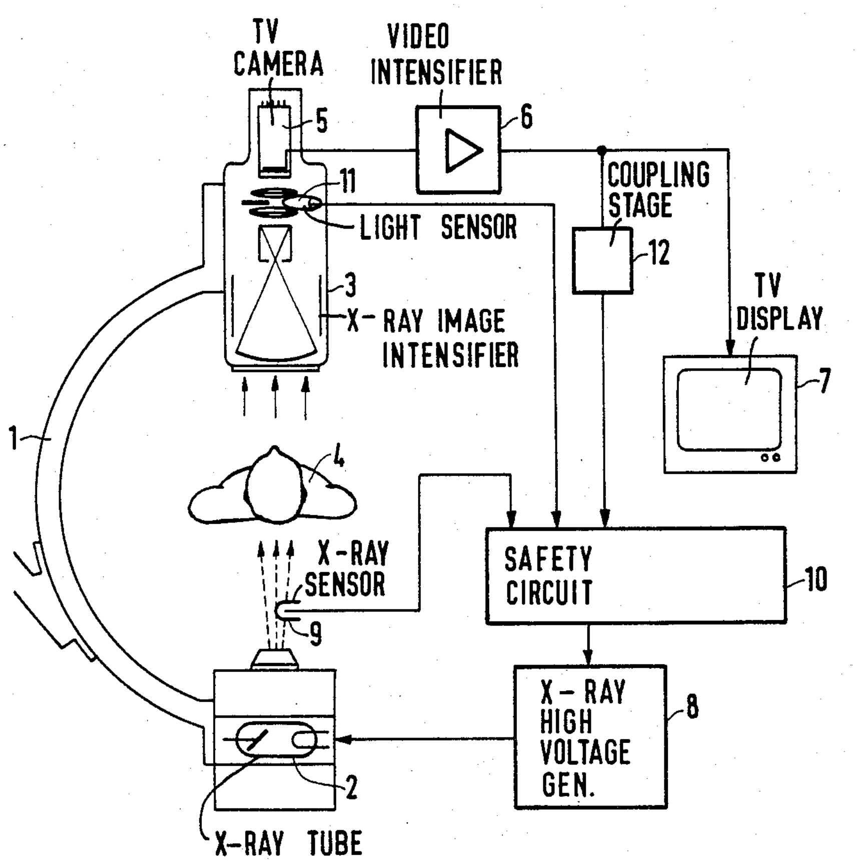
TV
CAMERA
VIDEO
INTENSIFIER
5
6
11
LIGHT SENSOR
COUPLING
STAGE
12
3
X- RAY IMAGE
INTENSIFIER
TV
DISPLAY
7
1
4
X-RAY
SENSOR
9
SAFETY
CIRCUIT
10
X - RAY
HIGH
VOLTAGE
GEN.
8
2
X-RAY TUBE

X-RAY DIAGNOSTIC SYSTEM HAVING AN IMAGE INTENSIFIER TELEVISION CHAIN

BACKGROUND OF THE INVENTION

1. Field of the Invention

The present invention relates to x-ray diagnostic systems including an image intensifier chain, and in particular to such a system with a means for automatically disconnecting the x-ray tube from the high voltage generator if the absence of selected signals is detected.

2. Description of the Prior Art

An x-ray diagnostic system having an x-ray tube connected to a high voltage generator and having an image intensifier television chain is described in German OS No. 2 803913, corresponding to U.S. Pat. 4,335,311. This system includes a control loop for monitoring the x-ray dose rate and maintaining the dose rate at a constant level on the basis of an adjusted nominal value. The actual value of the dose rate is formed by a sensor disposed in the light path between the output of the x-ray image intensifier and the television camera.

In any x-ray diagnostic system, it is possible that inspite of the presence of x-radiation, no image appears at the output of the x-ray image intensifier. It is also possible that even if a signal appears at the output of the x-ray image intensifier, a video or television signal may still be lacking. The absence of such signals may be caused by any number of disturbances or malfunctions. In conventional x-ray diagnostic systems of the type identified above, the patient and the technician or physician are unnecessarily exposed to radiation because the x-ray source continues to emit x-rays, even though no usable signal is present. In addition, unnecessary loading of the high voltage generator and the x-ray tube occurs as a result of the dose rate being automatically raised to a higher level by the dose rate control loop.

SUMMARY OF THE INVENTION

It is an object of the present invention to provide an x-ray diagnostic system having an image intensifier television chain which, upon the presence of x-radiation, undertakes an automatic disconnection of the x-ray tube from the high voltage generator if no image occurs at the output of the x-ray image intensifier and/or if no video signal is present.

The above object is inventively achieved in an x-ray diagnostic apparatus having a means for detecting the presence of x-radiation from the x-ray tube, a means for detecting the presence of light at the output of the x-ray image intensifier, and a means for detecting the presence of a video signal corresponding to the x-ray image. All of the above detectors generate an electrical signal signifying the presence of the respective monitored phenomena, the signals being supplied to a safety circuit. The safety circuit automatically disconnects the x-ray tube from its high voltage generator if, after the presence of x-radiation is detected, no light and/or no video signal appears. The x-ray image intensifier as well as the television chain is thus monitored such that the patient is not exposed to unnecessary (unused) radiation and also eliminates unnecessary loading of the high voltage generator and x-ray tube.

DESCRIPTION OF THE DRAWING

The single figure is a schematic representation of an x-ray diagnostic insulation constructed in accordance with the principles of the present invention.

DESCRIPTION OF THE PREFERRED EMBODIMENTS

An x-ray diagnostic installation constructed in accordance with the principles of the present invention as shown in the drawing. The apparatus includes a C-shaped support member supporting an x-ray tube 2 and an x-ray image intensifier 3. A patient 4 lies in the ray trace between the x-ray tube 2 and the x-ray image intensifier 3. A television chain is connected to the x-ray image intensifier 3, the television chain including a television camera 5, a video intensifier 6, and a monitor 7. The x-ray tube 2 is powered by an x-ray high voltage generator 8.

A sensor 9 for detecting x-radiation is disposed in the ray trace between the x-ray tube 2 and the patient 4, in proximity to the housing for the x-ray tube 2. Upon the occurrence of x-radiation, the sensor 9 supplies an electric signal to a safety circuit 10.

A light sensor 11 is disposed at the output of the x-ray image intensifier 3. The light sensor 11, upon detecting the presence of light at the output screeen of the x-ray image intensifier 3, supplies a signal to the safety circuit 10.

A coupling stage 12 is interconnected between the video intensifier 6 and the safety circuit 10 for supplying a signal to the safety circuit 10 when a video signal appears at the output of the video intensifier 6.

The safety circuit 10 monitors whether, after the x-ray tube 2 is switched on, that is, after the occurrence of x-radiation, an output image actually appears at the output image screen of the x-ray image intensifier 3, and whether a video signal is actually generated which effects display of the x-ray image on the tv display 7. If an error or malfunction is present in the image detection system, that is, if the output image of the x-ray image intensifier 3 or the video signal is lacking, the safety circuit 10 supplies a control signal to the x-ray generator 8 which effects disconnection of the x-ray tube 2 therefrom. Generation of x-radiation thus ceases, so that the patient is not unnecessarily exposed to such radiation when no usable signal is being generated.

In addition to the television camera 5 shown in the drawing, a continuous film camera or a single shot camera can be optically connected to the output fluorescent screen of the x-ray image intensifier 3. Suitable sensors can be employed with these devices which supply additional signals to the safety circuit 10. The lack of a signal on one of these additional lines will also cause the safety circuit 10 to inhibit operation of the high voltage generator 8.

The high voltage generator 8 may be contained together with the x-ray tube 2 in a common housing, such as a single tank generator. Although modifications and changes may be suggested by those skilled in the art it is the intention of the inventor to embody within the patent warranted hereon all changes and modifications as reasonably and properly come within the scope of his contribution to the art.

I claim as my invention:

1. An x-ray diagnostic system comprising:

a means for generating x-radiation for irradiating a patient;

a high voltage means for powering said x-ray generating means;

an x-ray image intensifier for generating an optical x-ray image of said patient;

a television chain including a means for generating a video signal from said optical image;

a means for sensing the presence of x-radiation and for generating an electrical signal upon the occurrence thereof;

a means for detecting the presence of said optical image and for generating an electrical signal upon the occurrence thereof;

a means for detecting the presence of said video signal and for generating an electrical signal upon the occurrence thereof; and a safety circuit connected to each of said means for generating said electrical signals and further connected to said high voltage means, said safety circuit disconnecting said high voltage means from said x-ray generating means after the presence of x-radiation is sensed if no optical image and/or no video signal is detected.

* * * * *